United States Patent
Ashida et al.

(10) Patent No.: US 6,805,935 B2
(45) Date of Patent: Oct. 19, 2004

(54) OPTICAL RECORDING MEDIUM

(75) Inventors: Sumio Ashida, Tokyo (JP); Keiichiro Yusu, Kanagawa-Ken (JP); Katsutaro Ichihara, Kanagawa-Ken (JP); Naomasa Nakamura, Kanagawa-Ken (JP); Noritake Ohmachi, Chiba-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/392,890

(22) Filed: Mar. 21, 2003

(65) Prior Publication Data

US 2004/0022987 A1 Feb. 5, 2004

(30) Foreign Application Priority Data

Mar. 26, 2002 (JP) ........................................ 2002-086297

(51) Int. Cl.$^7$ ................................................. B32B 3/02
(52) U.S. Cl. ................... 428/64.1; 428/64.4; 428/64.5; 428/64.6; 430/270.13
(58) Field of Search ............................. 428/64.1, 64.4, 428/64.5, 64.6, 913; 430/270.13, 495.1, 945

(56) References Cited

U.S. PATENT DOCUMENTS

| | | | | |
|---|---|---|---|---|
| 5,817,389 A | * | 10/1998 | Ono | ......................... 428/64.1 |
| 6,296,915 B1 | | 10/2001 | Yusu et al. | |
| 6,511,788 B1 | * | 1/2003 | Yasuda et al. | ........ 430/270.13 |
| 6,689,444 B2 | * | 2/2004 | Nakai et al. | ............... 428/64.1 |
| 6,723,410 B2 | * | 4/2004 | Ohno et al. | ................ 428/64.1 |
| 2003/0099185 A1 | * | 5/2003 | Nakamura et al. | ....... 369/275.2 |
| 2004/0076908 A1 | * | 4/2004 | Oomachi et al. | ...... 430/270.13 |

* cited by examiner

Primary Examiner—Elizabeth Mulvaney
(74) Attorney, Agent, or Firm—Oblon, Spivak, McClelland, Maier & Neustadt, P.C.

(57) ABSTRACT

There is provided an optical recording medium capable of preventing cross erase and increasing its recording density. The optical recording medium includes: a reflecting film; a first transparent film provided on the reflecting film; a first semitransparent film provided on the first transparent film; a second transparent film provided on the first semitransparent film; a recording film provided on the second transparent film, the recording film being capable of reversibly changing an atomic arrangement; and a third transparent film provided on the recording film. The first semitransparent film has a complex refractive index of n–k satisfying relationships of $0<n<1$ and $1<k$, and a product of a thickness d (nm) of the first semitransparent film and an extinction coefficient k of the complex refractive index is $d \times k \leq 44$.

16 Claims, 10 Drawing Sheets

| MEDIA 1 | MEDIA 2 | MEDIA 3 |
|---|---|---|
| Ag ALLOY | Ag ALLOY | Ag ALLOY |
| ZnS:SiO$_2$ | ZnS:SiO$_2$ | ZnS:SiO$_2$ |
| Ag ALLOY | Ag ALLOY | Ag ALLOY |
| ZnS:SiO$_2$ | ZrO$_2$ | TiO$_2$ |
| GeSbTe | GeSbTe | GeSbTe |
| ZnS:SiO$_2$ | ZnS:SiO$_2$ | ZnS:SiO$_2$ |

|  | Ag | Pd | Cu | n | k | JITTER VALUE | |
|---|---|---|---|---|---|---|---|
|  |  |  |  |  |  | 1Tr | 3Tr |
| EXAMPLE 1 | 97.5 | 1.0 | 1.5 | 0.5 | 1.73 | 8.2 | 8.6 |
| EXAMPLE 2 | 92.0 | 1.0 | 7.0 | 0.94 | 1.69 | 9.2 | 9.9 |
| COMPARATIVE EXAMPLE 1 | 88.0 | 1.0 | 11.0 | 2.07 | 1.65 | 13.2 | 13.5 |

FIG. 13

|  | Al | Ti | n | k | JITTER VALUE | |
|---|---|---|---|---|---|---|
|  |  |  |  |  | 1Tr | 3Tr |
| EXAMPLE 3 | 99.0 | 1.0 | 0.56 | 3.8 | 8.8 | 9.1 |
| COMPARATIVE EXAMPLE 2 | 88.0 | 12.0 | 2.1 | 3.5 | 14.5 | 15 |

FIG. 14

|  |  | n | k | JITTER VALUE | |
|---|---|---|---|---|---|
|  |  |  |  | 1Tr | 3Tr |
| EXAMPLE 4 | Au | 1.57 | 1.93 | 12.5 | 12.8 |
| EXAMPLE 5 | Cu | 1.18 | 2.2 | 10.5 | 11.1 |
| COMPARATIVE EXAMPLE 3 | Mo | 3.0 | 3.2 | 14.0 | 14.8 |

FIG. 15

|  |  | n | K |
|---|---|---|---|
| EXAMPLE 1 | AgPdCu | 1.1 | 3.6 |
| EXAMPLE 3 | AlTi | 1.2 | 5.8 |
| EXAMPLE 4 | Au | 0.17 | 3.15 |
| EXAMPLE 5 | Cu | 0.21 | 3.67 |

FIG. 16

| | Ag | Pd | Cu | $n_{208}$ | $k_{208}$ | JITTER VALUE | |
|---|---|---|---|---|---|---|---|
| | | | | | | 1 TIME | 10 TIMES |
| EXAMPLE 1 | 97.5 | 1.0 | 1.5 | 0.5 | 1.73 | 8.2 | 8.2 |
| EXAMPLE 2 | 92.0 | 1.0 | 7.0 | 0.94 | 1.69 | 9.2 | 9.7 |
| COMPARATIVE EXAMPLE | 88.0 | 1.0 | 11.0 | 2.07 | 1.65 | 13.2 | 13.9 |

FIG. 17

OPTICAL RECORDING MEDIUM

CROSS REFERENCE TO RELATED APPLICATION

This application is based upon and claims the benefit of priority from the prior Japanese Patent Application No. 2002-86297 filed on Mar. 26, 2002 in Japan, the entire contents of which are incorporated by reference.

BACKGROUND OF THE INVENTION

1. Field of the Invention

The present invention generally relates to an optical recording medium for reversibly changing a state by irradiation with light beams to record information. More specifically, the invention relates to a phase change optical recording medium which has a change of state wherein the atomic arrangement of a thin film for holding recording changes between amorphous and crystalline arrangements.

2. Related Art

A typical phase change optical recording film has an amorphous atomic arrangement when its portion heated to its melting point or higher to melt is rapidly cooled. When the phase change optical recording film is held in a crystallized temperature range below the melting point for a predetermined time or longer, it is crystallized if its initial state is amorphous, whereas it remains crystal if its initial state is crystal. Since the intensity of reflected light from an amorphous region is different from the intensity of reflected light from a crystalline region, the principle of a phase change optical recording medium is that the intensity of reflected light is converted into the intensity of an electric signal to be analog-to-digital converted to read information.

There are two methods for increasing the amount of information capable of being recorded in a single recording medium, i.e. a recording capacity. One method is a method for scaling down the pitch of recording marks in track directions. In this method, if the degree of scale down proceeds, the pitch becomes smaller than the size of a reproducing light beam, so that there are some cases where two recorded marks are temporarily included in a reproducing beam spot. If the recording marks are sufficiently spaced from each other, a regenerative signal can be greatly modulated to obtain a signal having a large amplitude. However, if the recording marks are close to each other, the amplitude of the signal is small, so that errors are easy to occur when the signal is converted into digital data.

Another method for improving a recording density is a method for narrowing the track pitch. This method can increase the recording density without being greatly influenced by the decrease of the signal strength due to the scale down of the mark pitch. However, in this method, there is a problem in that, in a region in which a track pitch is substantially equal to or smaller than the size of a light beam, there is caused a so-called cross erase wherein information on a certain track deteriorates when a writing or erasing operation is carried out in an adjacent track.

Two causes of cross erase are considered. One cause is that, when adjacent tracks are irradiated with a beam, the light intensity of the beam at the bottom edge thereof within a subject track is not small, so that the recording mark of the track is deteriorated by only the effect of irradiation with light. The other cause is that, when adjacent tracks are heated by a light beam, generated heat is transferred to the tracks by heat transfer in film in-plane directions, so that the shape of a recording mark is deteriorated by the influence thereof. Since the influence of the cross erase due to the latter influence can be reduced by decreasing heat transfer in the film in-plane directions, it has been devised to reduce the cross erase by more greatly promoting heat conduction in directions perpendicular to the plane of a recording film than in the in-plane directions by forming a so-called rapid-cooling structure by arranging a film having a large conductivity and/or heat capacity in the vicinity of a recording film.

For example, a conventional phase change optical recording medium shown in FIG. 10 comprises a substrate 301, a metal reflecting film 302 formed on the substrate 301, a transparent dielectric film 303 formed on the metal reflecting film 302, a recording film 304 formed on the dielectric film 303, a transparent dielectric film formed on the recording film 304, and a cover layer 306 formed on the dielectric film 305. That is, the dielectric film 303 is arranged between the recording film 304 and the metal reflecting film 302 for ensuring a signal strength by the reflection of light, and the dielectric film 303 is formed so as to be relatively thin, so that heat generated by the recording film 304 can easily escape to prevent heat from being transferred in the film in-plane direction. As the thickness of the dielectric film 303 decreases, heat transfer in direction perpendicular to the plane of the film can be promoted to improve cross erase.

However, if the dielectric film 303 is too thin, heat transfer to the reflecting film 302 starts simultaneously with heating due to laser beams during recording, so that there is a problem in that the temperature rise of the recording film 304 is insufficient, whereby the temperature of an area required to form a recording mark does not reach the melting point. In addition, if a laser power of erase level is applied, the mark cools immediately after heating. Therefore, the temperature of the mark can not be held in a temperature range capable of crystallizing the mark for a sufficiently long time, so that there is a problem in that it is difficult to crystallize the mark, i.e. to carry out an erasing operation, thereby remarkably deteriorating the erasing rate.

Conversely, if the dielectric film 303 is too thick, there is no problem on the power margin and erasing rate with respect to laser beams during recording. However, as described above, heat transfer into the plane of the film is not only promoted to violently cause cross erase, but the cooling rate of the recording film 304 is slow. Therefore, there is a problem in that the region melt during recording is crystallized again without being amorphous, so that the formed mark is too small.

Japanese Patent Laid-Open No. 2000-215516 discloses that cross erase can be suppressed by including at least a recording layer, a top protective layer, an intermediate layer and a reflecting layer in order from a light incident side and by defining characteristics of the materials of the intermediate and reflecting layers. However, since this method does not sufficiently select the material of the intermediate layer and selects a material having a low thermal conductivity, it is difficult to carry out rapid cooling, so that this method can not sufficiently reduce cross erase.

Thus, the thickness and heat conduction characteristics of the dielectric film between the metal reflecting film and the recording film are required to simultaneously eliminate the problems on the power sensitivity in recording, cross erase, recrystallization and erasing rate. However, conventional means can not simultaneously satisfy all of them.

SUMMARY OF THE INVENTION

It is therefore an object of the present invention to eliminate the aforementioned problems and to provide an optical recording medium which is capable of preventing cross erase and which has a high recording density.

According to a first aspect of the present invention, an optical recording medium includes: a reflecting film; a first transparent film provided on the reflecting film; a first semitransparent film provided on the first transparent film; a second transparent film provided on the first semitransparent film; a recording film provided on the second transparent film, the recording film being capable of reversibly changing an atomic arrangement; and a third transparent film provided on the recording film, wherein the first semitransparent film has a complex refractive index of n−ik satisfying relationships of $0<n<1$ and $1<k$, and a product of a thickness d (nm) of the first semitransparent film and an extinction coefficient k of the complex refractive index is $d \times k \leq 44$.

According to a second aspect of the present invention, an optical recording medium includes: a reflecting film; a first transparent film provided on the reflecting film; a first semitransparent film provided on the first transparent film; a second transparent film provided on the first semitransparent film; a recording film provided on the second transparent film, the recording film being capable of reversibly changing an atomic arrangement; and a third transparent film provided on the recording film, wherein the first semitransparent film is formed of a simple substance (elementary substance) or alloy containing 90 at % or more of at least one of aluminum, silver, gold and copper, the first semitransparent film having a thickness of 25 nm or less.

According to a third aspect of the present invention, an optical recording medium includes: a reflecting film; a first transparent film provided on the reflecting film; a first semitransparent film provided on the first transparent film; a second transparent film provided on the first semitransparent film; a recording film provided on the second transparent film, the recording film being capable of reversibly changing an atomic arrangement; a third transparent film provided on the recording film; and a second semitransparent film provided on the third transparent film, wherein the first semitransparent film is formed of a simple substance (elementary substance) or alloy containing 90 at % or more of at least one of aluminum, silver, gold and copper, the first semitransparent film having a thickness of 25 nm or less, and wherein the second semitransparent film is formed of a simple substance or alloy containing 90 at % or more of at least one of aluminum and silver, the second semitransparent film having a thickness of 25 nm or less.

BRIEF DESCRIPTION OF THE DRAWINGS

FIG. 13 is a table showing the measured results of jitter values in Examples 1 and 2 of an optical recording medium in the first embodiment;

FIG. 14 is a table showing the measured results of jitter values in Example 3 of an optical recording medium in the first embodiment;

FIG. 15 is a table showing the measured results of jitter values in Examples 4 and 5 of an optical recording medium in the first embodiment;

FIG. 16 is a table showing the measured results of complex refractive indexes in Examples 1, 3 and 4 of an optical recording medium in the first embodiment when the wavelength of a light source is 650 nm; and FIG. 17 is a table showing the measured results of jitter values in Examples 1 and 2 of an optical recording medium in the second embodiment.

DESCRIPTION OF THE EMBODIMENTS

Figure 1:
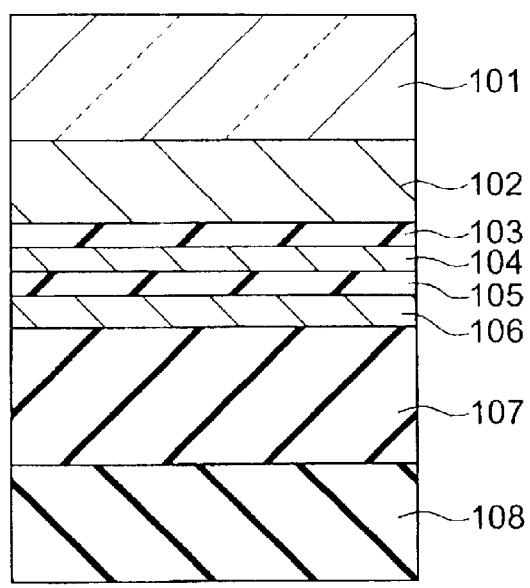
FIG. 1 is a sectional view showing the construction of the first embodiment of a phase change optical recording medium according to the present invention.

Referring now to the accompanying drawings, the embodiments of the present invention will be described below. The inventors have sufficiently considered the above-described objects and have concluded that the ideal construction of a single layer recording medium satisfies the following requirements.

(1) Since heat conduction up to 10 ns after irradiation with a recording beam should be such that it allows heating of the recording film to the melting point or more during recording at an actual laser power, the thermal conductivity of a first dielectric film close to a recording film must not be too high.

(2) Since heat conduction from 10 ns till 30 ns should surely make amorphous during solidification, a second film of a sufficiently high thermal conductivity must be provided right above the first dielectric film.

(3) Since heat conduction should thereafter prevent the occurrence of cross erase due to heat transfer to an adjacent track, a third film having a high heat capacity must carry thermal diffusion.

As an example of a concrete construction, it is required that a film (a low heat conductivity film) having a heat conductivity, which is equal to or lower than that of ZnS-:SiO$_2$ (mole ratio ZnS:SiO$_2$=80:20), and having a thickness of 6 nm or more is provided as each of dielectric films for vertically sandwiching a recording film in order to ensure recording sensitivity. A film having a heat conductivity, which is equal to or higher than $ZnS:SiO_2$, may be provided between the recording film and a reflecting film. For example, an interface film for promoting crystallization may be provided just above the recording film. The thickness of the film must not exceed 10 nm if the film contacts the recording film. As the next condition, the thickness of the low heat conductivity film must not be 20 nm or more. If the thickness is 20 nm or more, the time for the recording film to be held at a high temperature is too long, so that heat conduction in lateral directions are more greatly promoted than heat conduction in directions perpendicular to the reflecting film, thereby violently causing cross erase.

In order to meet the requirement (2), it is advantageous that a second film having a high heat conductivity is selected regardless of dielectric and metal, and it was revealed that a metal having a heat conductivity ten times or more as high as that of a dielectric is advantageous after various studies. Moreover, it was revealed that there are some cases where the reflectance of the recording medium can not be set to be in a preferred range if a metal film is used as the second film.

In the case of a so-called High-to-Low polarity, which means that Rc>Ra where the reflectance of a non-grooved crystal portion is Rc and the reflectance of a non-grooved amorphous portion is Ra, the greater Rc–Ra lead to the larger signal amplitude. At the same time, for the same amount of Rc–Ra, the smaller Ra is preferred because it leads to less noise. Assuming that the optical constant (complex refractive index) of the material of a preferred second film to satisfy this was found to be 0<n<1 and k>1 where n–ik is the refractive index of the second film.

As another requirement satisfying the above described request, it was also revealed that a fourth transparent film between the second and third films must be provided so that the second film does not contact the third film. Therefore, it was revealed that the above described requests (1) to (3) can be satisfied by adopting a suitable metal film as the second film, a transparent dielectric film as the fourth film, and a metal reflecting film having a high heat capacity as the third film.

(First Embodiment)

The construction of the first embodiment of a phase change optical recording medium according to the present invention is shown in FIG. 1. This phase change optical recording medium in the first embodiment satisfies the above described requests (1) to (3), and comprises a substrate 101 of, e.g., polycarbonate, a metal reflecting film 102 formed on the substrate 101, a transparent dielectric film 103 formed on the metal reflecting film 102, a semitransparent metal film 104 formed on the dielectric film 103, a transparent dielectric film 105 formed on the semitransparent metal film 104, a recording film formed on the dielectric film 105, a transparent dielectric film 107 formed on the recording film 106, and a cover layer 108 formed on the dielectric film 107.

Figure 2:
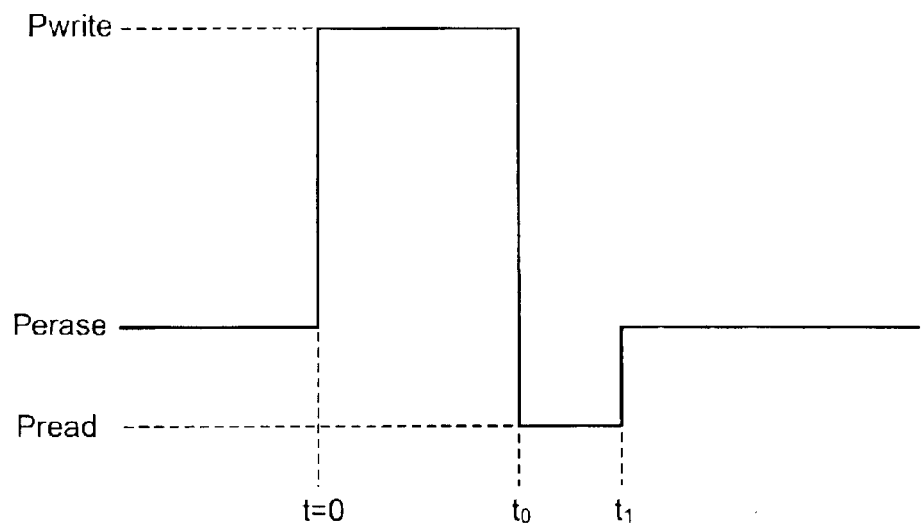
FIG. 2 is a timing chart showing the variation in power of a laser pulse with the elapse of time.
Figure 3:
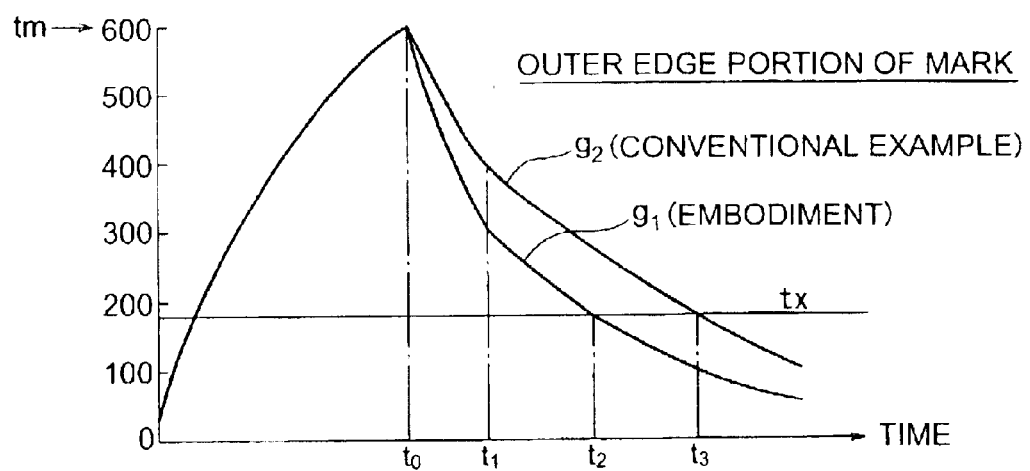
FIG. 3 is a graph showing a temperature history in the outer edge portion of a mark when an optical recording medium in the first embodiment and a conventional recording medium are irradiated with a laser pulse of a recording power.

This phase change optical recording medium in the first embodiment can reduce cross erase. Referring to the drawings, this will be described in detail. With respect to characteristics of the recording film 106 for use in this embodiment, it is assumed that the melting point is 600° C. and the crystallization starting temperature is 180° C. It is also assumed that the recording laser power emits light in timing shown in FIG. 2. That is, it is assumed that there are given powers of an erase level Perase for a period of t<0, a record level Pwrite for 0<t<$t_0$, a read level Pread for a period of $t_0$<t<$t_1$ (this period will be hereinafter referred to as an off pulse), and an erase level Perase in $t_1$<t. FIG. 3 shows a temperature history of a recording film at a point (which will be hereinafter referred to as a point P), at which a coordinate position in track directions at t=0 is equal to the center of a spot of a laser beam and at which a position in radial directions of an optical disk is equal to the outermost edge of a recording mark. The position of a point is shown in FIG. 11. In FIG. 3, a graph $g_1$ shows a temperature history of a recording film 106 of a phase change optical recording medium in this embodiment, and a graph $g_2$ shows a temperature history of a recording film 304 of a conventional phase change optical recording medium shown in FIG. 10. Since this point P is positioned on the outermost edge of a range to be a mark, a portion inside the point P, i.e. a place closer to the center of a track, is heated to melt. A portion outside the point P, i.e. a place apart from the center of the track, does not melt since its temperature does not reach the melting point. In general, it is considered that it is determined whether a phase change optical recording medium is recrystallized after melting, by examining a temperature history at the point P to determine whether the point P is held for a predetermined time or longer in a temperature range which is the melting point or lower and which is a crystallizing temperature or higher. This predetermined time is called a phase change optical recording crystallizing time which is a physical value of a used recording film and which is a value determined by the composition of the recording film. Since the cooling rate of the recording film inside the point P after melting is higher than the cooling rate at the point P, the time in which the point inside the point P is held in the above described temperature range is shorter than the crystallizing time if the time in which the point P is held in the above-described temperature range is shorter than the crystallizing time. Therefore, in this case, crystallization does not occur over the whole range in which the recording mark is formed.

In FIG. 3, it is forced to be heated by a recording power up to $t_0$, and its temperature substantially reaches the melting point. Thereafter, it is rapidly cooled by a cooling pulse. In this embodiment, the temperature after the cooling pulse is completed, i.e. the temperature at $t_1$, is 300° C. (see graph $g_1$). Subsequently, since it is irradiated with a laser beam of an erase level, the cooling rate is decreased by its influence, but it is continuously cooled. Since the temperature reaches a crystallizing temperature $t_x$ at time $t_2$, crystallization does not subsequently occur. Therefore, if the recording film 106 of a material having a crystallizing time longer than $\Delta T_a = t_2 - t_1$ is used, it is possible to prevent the recrystallization of the recording mark.

On the other hand, if the conventional construction is used, the cooling rate during the cooling pulse is slow as shown by the graph $g_2$ in FIG. 3, the temperature is only decreased to 400° C. even at $t_1$ after the cooling pulse is completed. Since the subsequent cooling is carried out from 400° C., the cooling time is longer than that in this embodiment. In a conventional example, the time at the crystallizing temperature $t_x$ is a time $t_3$, and the recording film is held at a temperature, at which crystallization can be carried out, for a long time of $t_3 - t_0$. Therefore, if a recording film having a crystallizing time of $\Delta t_b = t_3 - t_0$ or shorter is used, recrystallization occurs.

As compared with a phase change optical recording medium in this embodiment, $\Delta t_a < \Delta t_b$, so that the phase change optical recording medium in this embodiment is advantageous in order to prevent recrystallization. In other words, it is found that, in this embodiment, the width of a melting region required to form a recording mark having the same width may be narrower, so that thermal effect to a mark row recorded in an adjacent track is small.

As described above, in the medium in this embodiment, the cooling rate is particularly high mainly for $t_0<t<t_1$, i.e. for the period of the cooling pulse. The reason for this is that the distance from the metal film closest to the recording film 106 is shorter than that in the conventional phase change optical recording medium. The metal film closest to the recording film 106 is herein the semitransparent metal film 104 shown in FIG. 1. Since it is semitransparent, it is a very thin film. However, since its heat conductivity is far greater than that of a dielectric or semiconductor, it can enhance the cooling rate during the cooling pulse. Since the heat flow during the period of cooling pulse occurs for a very short time immediately after a recording power irradiation, the temperature does not yet rise even if the metal film 104 is very thin and thus have a very small heat capacity. Therefore, the heat flow in the dielectric films 105 and 107 adjacent to the recording film 106 is controlled by a direction perpendicular to the recording film 106.

Figure 10:
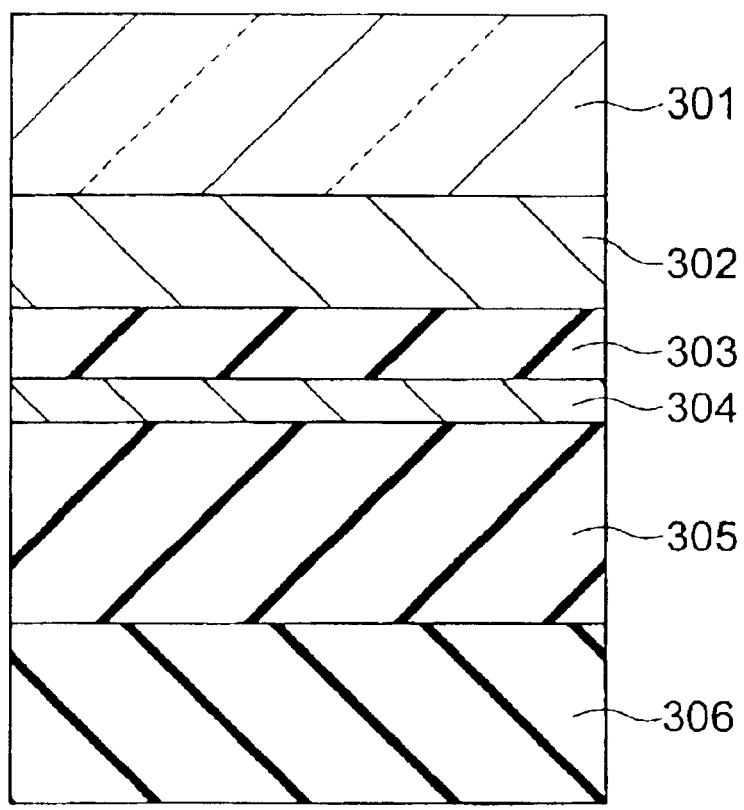
FIG. 10 is a sectional view showing the construction of a conventional phase change optical recording medium.
Figure 11:
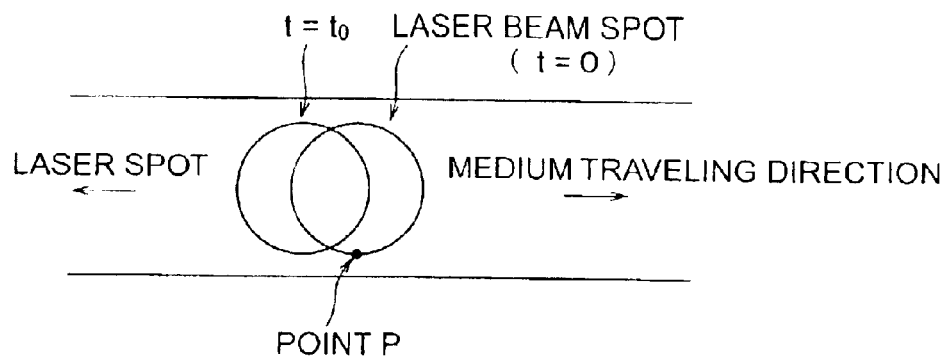
FIG. 11 is an illustration showing a point which is equal to the outermost edge of a recording mark of a recording film.

It is herein compared with a case where the distance between the recording film 304 and the metal reflecting film 302 decreases without changing the construction of the conventional phase change optical recording medium shown in FIG. 10. In the conventional phase change optical recording medium, if the metal reflecting film 302 approaches the recording film 304, the heat conductivity is too high because of the thick metal reflecting film 302, so that most of heat received by laser irradiation is transmitted through the reflecting film 302 to be transferred in a film in-plane direction. That is, the laser power for reaching a temperature required to form a recording mark increases. Therefore, there is a problem in that an expensive laser is required and power consumption is large.

Figure 4:
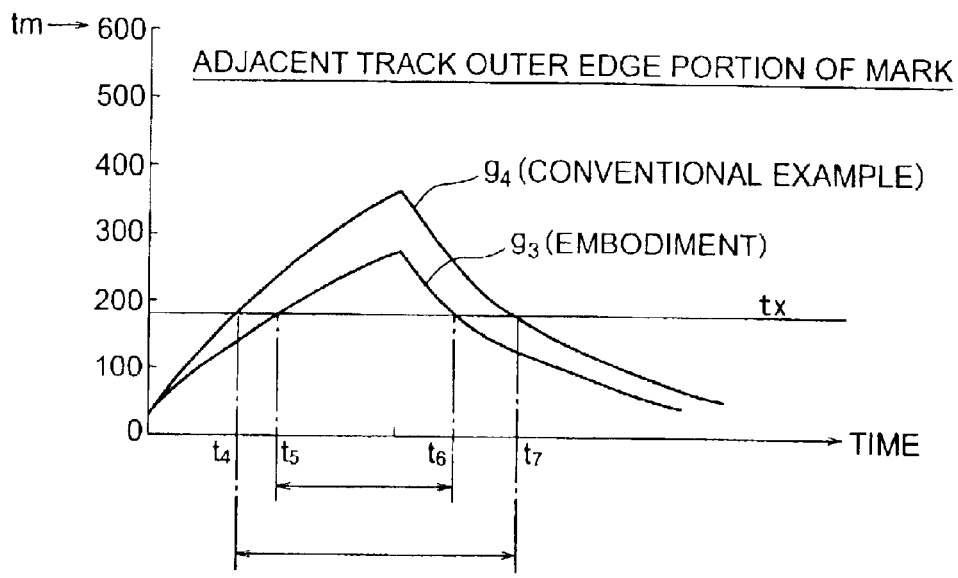
FIG. 4 is a graph showing a temperature history in the outer edge portion of an adjacent track mark when an optical recording medium in the first embodiment and a conventional recording medium are irradiated with a laser pulse of a recording power.
Figure 12:
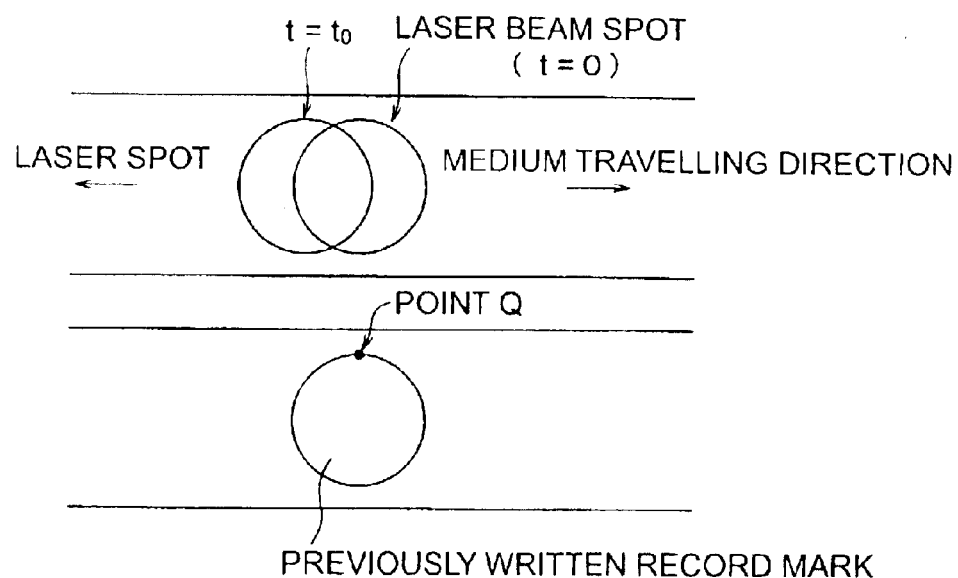
FIG. 12 is an illustration showing the position of a beam spot after a recording power irradiation starts.

Similarly, graphs $g_3$ and $g_4$ in FIG. 4 show temperature histories on the outer edge of a mark of an adjacent track (nearer to a noticed recording track) with respect to the phase change optical recording medium in this embodiment and the conventional phase change optical recording medium shown in FIG. 10, respectively. The outer edge of the mark of the adjacent track shown by the graph is shown by a point Q in the plan view of FIG. 12. The recording timing is the same as that in FIG. 3. The position of a beam spot after starting a recording power irradiation, i.e. t=0, along with the end of the recording power irradiation, i.e., $t=t_0$, is shown in FIG. 12.

As described above, in the phase change optical recording medium in this embodiment, the heat flow in the recording track for the period of $t<t_1$ is controlled by a vertical component, so that heat diffusion to an adjacent track is small. Therefore, in the temperature history of the phase change optical recording medium in this embodiment, the temperature after the irradiation with the recording pulse is a low temperature of 270° C. as shown by the graph $g_3$.

On the other hand, in the conventional phase change optical recording medium shown in FIG. 10, the dielectric films 303 and 305 adjacent to the recording film 304 are relatively thick, heat transfer in lateral directions occurs to some extent. Therefore, the maximum temperature in the outer edge portion of the adjacent track is a relatively high temperature of 350° C. as shown by the graph $g_4$.

After the heat history of the outer edge portion of the adjacent track is studied to compare the time held in a temperature range at which crystallization can be carried out, $\Delta t_c=t_6-t_5$ in this embodiment, $\Delta t_d=t_7-t_4$ in the conventional example, and $\Delta t_c<\Delta t_d$, so that cross erase can be suppressed in this embodiment.

A publicly known example which is similar to this embodiment at first sight will be briefly described below. Japanese Patent Laid-Open No. 2000-222777 discloses that it is possible to improve the cooling power of a recording film to reduce overwrite distortion by providing a recording layer, a reflecting layer allowing transmission of light beams, and a thermal diffusion layer on the far side from the reflecting layer viewed from a light incident surface. However, as clearly described in the above described Japanese Patent Laid-Open No. 2000-222777, this construction is provided for enhancing density by setting the whole transmittance to be 50 to 70%, providing a second recording layer on the far side from the light incident surface with respect to the medium, and using two layers of recording media, so that reflectance decreases due to the enhancement of transmittance. Therefore, as compared with a recording medium designed to hold recording by a single layer having a high reflectance, the difference in reflectance between crystal and amorphous is small, the amplitude of a regenerative signal is small, and jitter is large. That is, in order to obtain the same signal quantity, a track pitch or mark pitch for recording must be set to be larger than that of a single layer medium, so that the recording capacity per one layer of recording film is substantially smaller than that of the single layer medium.

On the other hand, this embodiment is limited to a single layer type recording medium which is not required to enhance transmittance as a whole, and is designed to comply with a request for the increase of the recording capacity by increasing the recording density of the single layer recording medium without increasing the recording capacity by double layers. Therefore, the medium using the single layer is not required to enhance the whole transmittance unlike the above described Japanese Patent Laid-Open No. 2000-222777, and it is important to increase the difference in reflectance between crystal and amorphous as described above. In addition, there is an advantage in that the medium of the single layer can be far easily produced than a medium of two or more layers since it is not required to carry out complicated steps of preparing a thin separating layer and aligning two layers.

In the above-described Japanese Patent Laid-Open No. 2000-222777, the reflecting layer must be semitransparent to ensure transmittance in order to realize a laminated medium using recording films of two or more layers. As clearly described in the above-described Japanese Patent Laid-Open No. 2000-222777, cooling degree is insufficient as a side effect thereof, and in order to compensate for this, a dielectric film having a high thermal conductivity is added.

On the other hand, the idea of this embodiment has been made, in a single layer medium in which high transmittance is not required, in order to reconsider thermal conduction from a standpoint of reduction of cross erase and in order to freely control cooling processes in three stages.

The semitransparent reflecting layer in the above-described Japanese Patent Laid-Open No. 2000-222777 is substituted for the conventional total reflection type reflecting layer. The semitransparent layer 104 in this embodiment serves to carry out the cooling process in the second stage of the cooling processes in three stages. Therefore, it is difficult to make the idea of the present invention even after the above described Japanese Patent Laid-Open No. 2000-222777 is known, so that it is clear that the present invention sufficiently has novelty and inventive step over the above described Japanese Patent Laid-Open No. 2000-222777.

The cooling processes in three stages are as follows. First, the first cooling process is a cooling process occurring before to in FIG. 3, i.e. for a very short time immediately after a recording power irradiation. According to the construction in this embodiment, the first cooling process is mainly carried out by the dielectric film 105 close to the recording film. Since the heat conductivity of the dielectric film 105 is sufficiently low, its temperature easily reaches its melting point, there is no side effect for decreasing sensitivity. The second cooling process is a dominant cooling mechanism for a period of $t_0$ to $t_1$ shown in FIG. 3, and is carried out by the semitransparent metal film 104. Since this semitransparent metal film 104 has a far higher heat conductivity than dielectric films although it is very thin, it has the functions of promoting rapid cooling and heat transfer in directions perpendicular to the plane of the film and of inhibiting heat transfer in lateral directions, which causes cross erase. The third cooling process is a cooling mechanism acts mainly after $t_1$ in FIG. 3, and is mainly carried out by the reflecting film 102 and dielectric film 103 on the side of the reflecting film. This has the function of backing up the cooling of the semitransparent metal film 104 by utilizing the high heat conductivity and thermal capacity due to the thick reflecting film, similar to the recording medium having the same structure as that in the conventional example.

Of course, with respect to the inhibition of cross erase, the effects of the present invention has an inventive step over the technique disclosed in the above described Japanese Patent Laid-Open No. 2000-222777. This will be described below. The construction disclosed in the above described Japanese Patent Laid-Open No. 2000-222777 can more surely promote heat flow in vertical directions to more effectively inhibit cross erase than the semitransparent medium having no thermal diffusion layer. However, it is not sufficient since the heat conductivity of the thermal diffusion layer provided on the far side from the reflecting film is about one tenth as small as metals. In particular, there is a problem in that heat transfer in film in-plane directions continues for ten to tens ns after a beam irradiation, to promote the occurrence of cross erase due to heat conduction. In addition, since the reflecting layer is provided just above the interface layer, heat violently escapes during and immediately after a laser beam irradiation, so that there is a problem in that it is required to provide high power to heat it to a temperature above the melting point, which is necessary for recording.

Referring to FIG. 1, an example of this embodiment will be described below in detail.

FIG. 1 shows a sectional construction of an example of an optical recording medium in this embodiment. The optical recording medium in this example has a construction wherein a reflecting film 102 of an Ag alloy, a dielectric film 103 of $ZnS:SiO_2$, a semitransparent metal film 104 of an Ag alloy, a dielectric film 105 of $ZnS:SiO_2$, a recording film 106 of GeSbTe, and a dielectric film 107 of $ZnS:SiO_2$ are stacked in order from the opposite side to light incidence. The thickness of these films is 100 nm, 10 nm, 15 nm, 10 nm, 12 nm and 135 nm, respectively, in the same order. A single layer film of an Ag alloy was separately prepared, and its complex refractive index (optical constant) was measured by ellipsometry. As a result, the complex refractive index was 0.50–1.73i at a wavelength of 405 nm. Similarly, the complex refractive index (optical constant) of GeSbTe being the recording film 106 was measured. As a result, the complex refractive index was 2.6–2.1i in an amorphous state, and 1.45–2.8i in a crystal state. In addition, the above described $ZnS:SiO_2$ is $ZnS:SiO_2$=80:20 in mole ratio. The optical recording media in this example was prepared by depositing the above-described films on a polycarbonate substrate 101 having a thickness of 1.1 mm in the above-described order by the sputtering method. After deposition, an ultraviolet curing resin was spin-coated to be photo-cured to form a cover layer 108 having a thickness of 0.1 mm.

Then, the whole surface of the recording film 106 was crystallized by a phase change medium initializing system having an elliptical beam having a width of 50 $\mu$m and a length of 1 $\mu$m, to complete the medium. Grooves having a depth of 40 nm are provided on the substrate 101 at intervals of 0.6 $\mu$m. When it is evaluated as a land groove recording, the above-mentioned substrate yields the track pitch of 0.3 $\mu$m. Hereinafter, the groove track means a track farther from the light incident surface, and the land track means a track nearer to the light incident surface.

Using the above described optical recording medium, record and erase experiments were carried out. Evaluation was carried out by means of an optical disk evaluating system having a pick-up which has an objective lens of NA=0.85 and a semiconductor laser having a wavelength of 405 nm. Assuming that a pattern having a shortest mark length of 0.15 $\mu$m was 3T and a pattern having a longest mark length of 0.55 $\mu$m was 11T, a recording experiment was carried out by irradiating with pulse patterns formed by combining a series of 3, 4, . . . , 11T at random.

The optimum recording power was found out to be used to carry out the recording method.

Figure 5:
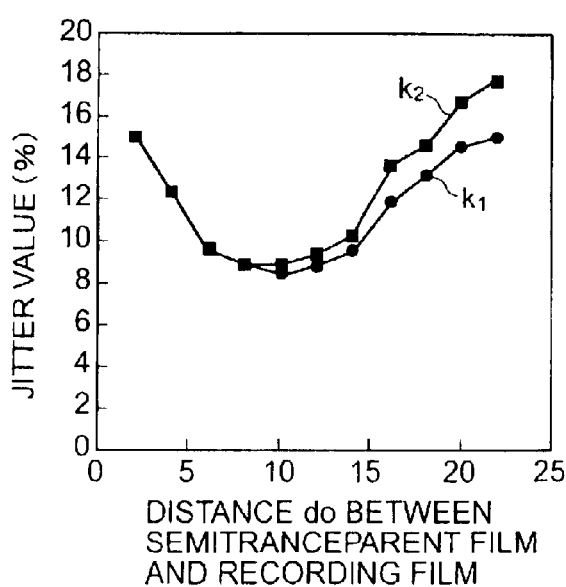
FIG. 5 is a graph showing the variation in jitter value after ten overwrite operations with respect to the distance between a semitransparent film and a recording film in the first embodiment.

As a comparison, media of the same film material were trial-manufactured by changing the distance (which is assumed to be $d_0$) between the semitransparent metal film 104 and the recording film 106, and evaluated. The distance do denotes the shortest distance between the bottom face of the semitransparent metal film 104 and the top face of the recording film 106 in FIG. 1. The results of this evaluation is shown in FIG. 5. The jitter value (curve $k_1$ in the figure) after ten overwrite operations in only the corresponding track was sensitively deteriorated when $d_0$ was less than 5 nm and exceeded 15 nm. This is caused by the fact that the recording sensitivity is insufficient when $d_0$ is decreased and that an amorphous mark is recrystallized to be reduced when $d_0$ is increased since the time held in a crystallizing temperature range is too long. The jitter value (curve k2 in the figure) after overwriting the same pattern in both adjacent tracks ten times was deteriorated when $d_0$ was large. This is caused by the fact that the outer edge portion of the mark in the corresponding track was partially crystallized so that the width of the mark was thin. The rate of increase of jitter before and after recording in the adjacent track was particularly bad when do was large. Also from this point, $d_0$ is not preferably too thick.

By the way, while do has been changed in FIG. 1, if the thickness of one film is separately changed, its reflectance is simultaneously changed, so that there are some cases where it is not possible to obtain a reflectance suitable for a recording medium. Therefore, the variation in reflectance was corrected by changing the thickness of the $ZnS:SiO_2$ film nearest to the light incidence in FIG. 5, i.e. the thickness of the dielectric film 107 in FIG. 1, so that any media can obtain the same reflectance. Since the dielectric film 107 is originally sufficiently thick, even if the thickness varies in a thickness adjusting range (about ±20 nm) for purposes of correction of the variation in reflectance, thermal function does not vary, and the cooling rate of the recording film does not vary. Meanwhile, in the following descriptions, in experiments for examining dependency on thickness for the same reason, the dielectric film on the side of light incidence (the dielectric film 107 in FIG. 1) in addition to the thickness of the film to be noticed was simultaneously varied to prevent the difference in reflectance from varying.

In this example, the extinction coefficient k of the Ag alloy of the semitransparent film is 1.73, and the thickness d of the semitransparent metal film 104 is 15 nm, so that its product d×k=25.95.

Figures 6, 7:
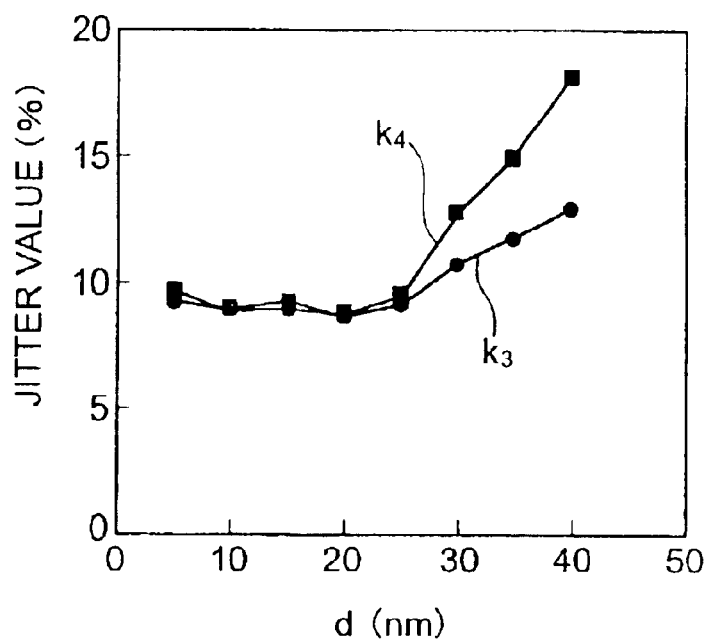
FIG. 6 is a graph showing the variation in jitter value after ten overwrite operations with respect to the thickness of a semitransparent film in the first embodiment.
FIG. 7 is a table showing constructions with respect to various materials of a dielectric film adjacent to a recording film in the first embodiment.

For a comparison, a medium having a different d×k value was trial-manufactured. In this case, the medium has a film construction wherein a reflecting film of an Ag alloy, a dielectric film of ZnS:SiO$_2$, a semitransparent film of an Ag alloy, a dielectric film of ZnS:SiO$_2$, a recording film of GeSbTe and a dielectric film of ZnS SiO$_2$ are stacked in order from the opposite side to the light incidence. At this time, the thickness d of the semitransparent film was varied. As shown in FIG. 6, the results are shown by a graph k$_4$ when the thickness d of the semitransparent film exceeds 25 nm. From characteristics of the jitter value after overwriting the same pattern in an adjacent track ten times, the jitter value exceeds 10% and rapidly increases. It was found that this was not preferred. The thickness d=25 nm of the semitransparent film corresponds to d×k=44 since the complex refractive index (optical constant) is 0.50–1.73i at a wavelength of 405 nm as described-above. The reason why the jitter value increases to deteriorate characteristics if the thickness of the semitransparent film exceeds 25 nm is that the silver alloy forming the semitransparent film is too thick and beyond the semitransparent region in this embodiment, so that the semitransparent film is not different from the usual total reflection recording medium. Therefore, the product d×k of the thickness d (nm) and extinction coefficient of the semitransparent film is preferably 44 or less. In FIG. 6, k$_3$ is a graph showing characteristics of jitter values after ten overwrite operations in only a corresponding track.

Then, it is assumed that the medium described in the above-described example is a medium 1. For comparison, there were trial-manufactured a medium (medium 2) wherein a reflecting film of an Ag alloy, a dielectric film of ZnS:SiO$_2$, a semitransparent film of an Ag alloy, a dielectric film of ZrO$_2$, a recording film of GeSbTe and a dielectric film of ZnS:SiO$_2$ are stacked in order from the opposite side to the light incidence, and a medium (medium 3) wherein a reflecting film of an Ag alloy, a dielectric film of ZnS:SiO$_2$, a semitransparent film of an Ag alloy, a dielectric film of TiO$_2$, a recording film of GeSbTe and a dielectric film of ZnS:SiO$_2$ are stacked in order. The constructions thereof are shown in FIG. 7. That is, the medium 2 was formed by substituting the dielectric film of ZrO$_2$ for the dielectric film 105 of ZnS:SiO$_2$ in the above described example, and the medium 3 was formed by substituting the dielectric film of TiO$_2$ for the dielectric film 105 of ZnS: SiO$_2$ in the above described example.

In the medium 2, the jitter value was 9.8% in only one track, and the jitter value was 10.2% after writing in both adjacent tracks. These values were preferred values. However, in the medium 3, the jitter value was 14.4% in one track, and the jitter value was 15% or more after writing in an adjacent track, so that characteristics are deteriorated. After measuring the heat conductivity of the ZrO$_2$ and TiO$_2$ films, the heat conductivity of the ZrO$_2$ film was 1.5 W/mK, and the heat conductivity of the TiO$_2$ was 10 W/mK. On the other hand, the heat conductivity of ZnS:SiO$_2$ in this embodiment was 0.6 W/mK. Therefore, it was revealed that the heat conductivity of the dielectric film 105 sandwiched between the recording film 106 and the semitransparent metal film 104 must not be too high. The heat conductivity of the dielectric film 105 is preferably 2.0 W/mK or less.

Meanwhile, the heat conductivity of a thin film can be measured by the alternating light irradiation method, e.g. PIT-1 produced by Shinku-Riko, Co., Ltd.

Of the two dielectric layers 103 and 104 sandwiched between the reflecting film 102 and the recording film 106, the materials of the dielectric film 104 suitably include SiO$_2$ and HfO$_2$, the heat conductivity of which is not too high, in addition to ZnS:SiO$_2$ and ZrO$_2$ described herein. Conversely, Al$_2$O$_3$ and AlN are not preferred since their heat conductivity is too high.

Figure 8:
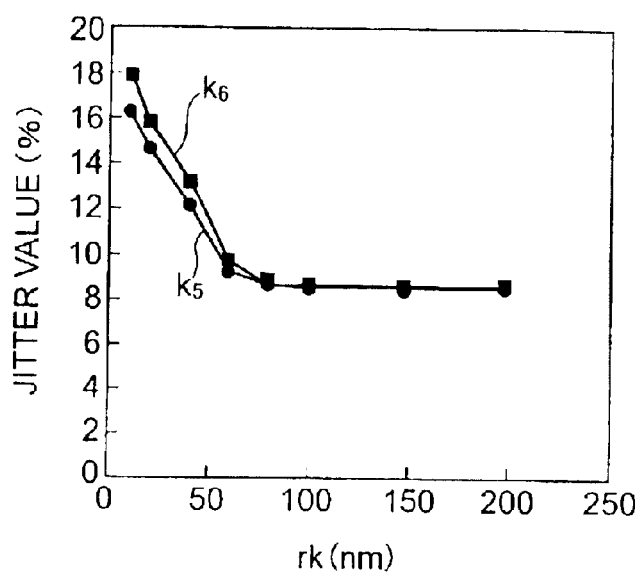
FIG. 8 is a graph showing the variation in jitter values after ten overwrite operations with respect to the product of the thickness of a reflecting film and an extinction coefficient in the first embodiment.

Moreover, for comparison, a phase change recording medium in an example, and a phase change recording medium having a reflecting film 102 having a different thickness from that of the phase change recording medium in this example were prepared. As the material of the reflecting film 102, a silver alloy having an optical constant of 1.73 was used, and the thickness of the reflecting film 102 was changed. As shown in FIG. 8, if the product rk of the thickness r and the extinction coefficient k is smaller than 60, the jitter value suddenly deteriorates. This is caused by the deterioration of the modulation amplitude reflected light returning to the pick-up (the difference in reflectance between crystal and amorphous portions) to decrease the signal strength and by the deterioration of the cooling power of the reflecting film to start to cause the recrystallization during the formation of an amorphous mark and to start to cause cross erase, since the reflecting film starts to transmit light. In FIG. 8, k$_5$ is a graph showing characteristics of jitter values after ten overwrite operations in only a corresponding track, and k$_6$ is a graph showing characteristics of jitter values after overwriting the same pattern in both adjacent tracks ten times. Herein, the same material was used and the thickness was changed. When r×k is smaller than 60 even if the material is changed, the jitter value deteriorates. The reflecting layer 102 is not preferably formed of a material having a small value of k, e.g. Si or Ge.

Meanwhile, the silver alloy used for the semitransparent metal film 104 in this example is AgPdCu which consists of 97.5 at % of Ag, 1.0 at % of Pd and 1.5 at % of Cu.

For comparison, various media having semitransparent films 104 having different compositions were trial-manufactured, and jitter values thereof were examined. The thickness of the semitransparent film 104 was the same as that in this example.

Referring to FIG. 13, the silver alloy will be described. As shown in FIG. 13, there were trial-manufactured a media in example 1 wherein the composition ratio of silver of the semitransparent film 104 was Ag=97.5 at %, a media in example 2 wherein the composition ratio of silver was Ag=92 at %, and a media in comparative example 1 wherein the composition ratio of silver was Ag=88 at %. Alloy films of above-mentioned compositions were deposited using sputtering targets having the compositions of Ag=97.5 at %, Ag=92 at % and Ag=88 at % respectively. Single layer thin films of Ag-alloys having above-mentioned compositions were formed by sputtering, and the complex refractive index (n−k) was measured. The results of measurement are shown in FIG. 13. In FIG. 13, the wavelength of light was 405 nm. As can be seen from FIG. 13, k did not so vary by the increase of the composition ratio of Ag, but n greatly increased. With respect to these media in examples 1, 2 and comparative example 1, jitter values after ten random signal recording operations in only a corresponding track are shown in 1Tr column of FIG. 13, and jitter values after ten overwrite operations of the same pattern in both adjacent tracks are shown in 3Tr column of FIG. 13. As can be seen from FIG. 13, the rates of increase of jitter values before and after recording in the adjacent tracks are small to decrease cross erase due to thermal effects. However, it was revealed that the jitter values themselves are decreased by the increase of the composition ratio of Ag and that the jitter value exceeds 13% in comparative example 1 wherein the composition ratio of Ag is 88%, the jitter value substantially having insufficient characteristics.

The reason for this will be described below. The optical recording medium can obtain a high signal strength as the difference between the reflectance of the amorphous portion and the reflectance of the crystal portion increases. However, in the three kinds of media compared above, the reflectance decreases as the comparative ratio of Ag of the semitransparent film increases. This is related to the real part of the complex refractive index of the semitransparent film as shown in FIG. 13. In general, with respect to characteristics of the phase change optical recording medium, as the difference in reflectance between amorphous and crystal portions is greater, the signal strength is higher, and reproduction can be carried out with smaller errors. As the imaginary part of the complex refractive index of the semitransparent film is larger, or as the real part thereof is smaller if the imaginary part is the same, the difference in reflectance can be increased. In example 1 of FIG. 13, n=0.5 which is low. However, it increases in order of example 2 and comparative example 1. In particular, the comparative example does not satisfy n<1 which is a preferred range in this embodiment, and the jitter value is particularly bad. Therefore, it is found that the composition ratio of Ag in the Ag alloy is preferably 90% or more.

Referring to FIG. 14, the Al alloy will be described below. There were prepared a medium in example 3 wherein a layer of AlTi alloy containing 99.0% of Al was used as the semitransparent film 104, and a medium in comparative example 2 wherein a layer of AlTi alloy containing 88.0% of Al. With respect to the media in example 3 and comparative example 2, jitter values after ten random signal recording operations in only a corresponding track are shown in 1Tr column of FIG. 14, and jitter values after ten overwrite operations of the same pattern in both adjacent tracks are shown in 3Tr column of FIG. 14. As can be seen from FIG. 14, the jitter values were good in example 3 since the composition ratio of Al is high and n is small, whereas the jitter values were deteriorated in comparative example 4 since the composition ratio of Al is low and n is increased four times. In FIG. 14, the wavelength used for the measurement of the complex refractive index was 405 nm. Therefore, the composition ratio of Al in the Al alloy is preferably 90.0% or more.

Referring to FIG. 15, a case where Au or Cu based metal is used as the material of the semitransparent film 104 will be described below. In FIG. 15, the wavelength used for the measurement of the complex refractive index was 405 nm. Both of Au and Cu have a high heat conductivity, and are preferably used for obtaining the cooling effects as described above. However, since Au and Cu have a greater value of n than an Ag or Al base alloy at a wavelength of 405 nm as shown in FIG. 15, they can optically obtain good effects. If Cu is used as example 5, the jitter values are better than those in example 4 wherein Au is used, but they are inferior to a case where an Ag or Al base alloy is used. In addition, n was suppressed to the minimum since pure metal was used for experiments. However, if the pure metal was combined with another metal to form an alloy in order to increase life, n was further increased, and the difference in reflectance decreased to further deteriorate jitter as described above. In addition, FIG. 15 shows optical constants of Mo as comparative example 3. Metals other than Ag, Al, Au or Cu base materials are not preferred since n of Mo is higher.

FIG. 16 shows optical constants of materials used for the semitransparent film 104 in examples 1, 3, 4 and 5 when the wavelength of the light source is 650 nm. Since both of Au and Cu can obtain a low value of n unlike the case of a wavelength of 405 nm, they can realize a preferred difference in reflectance as an optical recording medium, so that good jitter values can be obtained. Then, it was found that each of the composition ratio of Au in the Au alloy and the composition ratio of Cu in the Cu alloy is preferably 90% or higher in order to obtain good jitter values. Furthermore, it is found that the materials used for the semitransparent film 104 in examples 1 and 3 are beyond the scope of this embodiment for the longer wavelength of 650 nm since n is higher than that in the case of a short wavelength (405 nm).

While nothing has been provided between the recording film 106 and the dielectric films 105 and 107 sandwiching the recording film 106 therebetween in this example, a thin film may be provided before and after the recording film 106 in order to improve the erasing rate. The materials of this thin film include GeN, SiC, SiN and CrO. If the heat conductivity of this thin film is within the range defined in this embodiment, i.e. below 2.0 W/mK, it is within the scope of this embodiment, so that the above described thin film may be substituted for a part of the dielectric film 105 of FIG. 1. Even if the heat conductivity of the above described thin film exceeds 2.0 W/mK, if the thickness of the thin film is 5 nm or less, it is possible to obtain the same effects as those in this embodiment, and the above described thin film can be substituted for a part of the dielectric film of FIG. 1.

In the above-described embodiment, the reflecting film 102, the dielectric film 103, the semitransparent metal film 104, the dielectric film 105, the recording film 106 and the dielectric film 107 have been sequentially stacked on the substrate 101 so as to allow light to be incident on the dielectric film 107. Conversely, the dielectric film 107, the recording film 106, the dielectric film 105, the semitransparent metal film 104, the dielectric film 103 and the reflecting film 102 may be sequentially stacked on a transparent substrate so as to allow light to be incident on the substrate. In this case, a light source equipped with an objective lens suited to allow light to be incident on the substrate should be used. In addition, a protective film for protecting the reflecting film 102 may be provided on a surface opposite to a surface on which the dielectric film 103 is formed.

As mentioned-above, the semitransparent metal film 104 may be formed of a simple substance (elementary substance) or alloy containing 90 at % or more of at least one of aluminum, silver, gold and copper.

(Second Embodiment)

Figure 9:
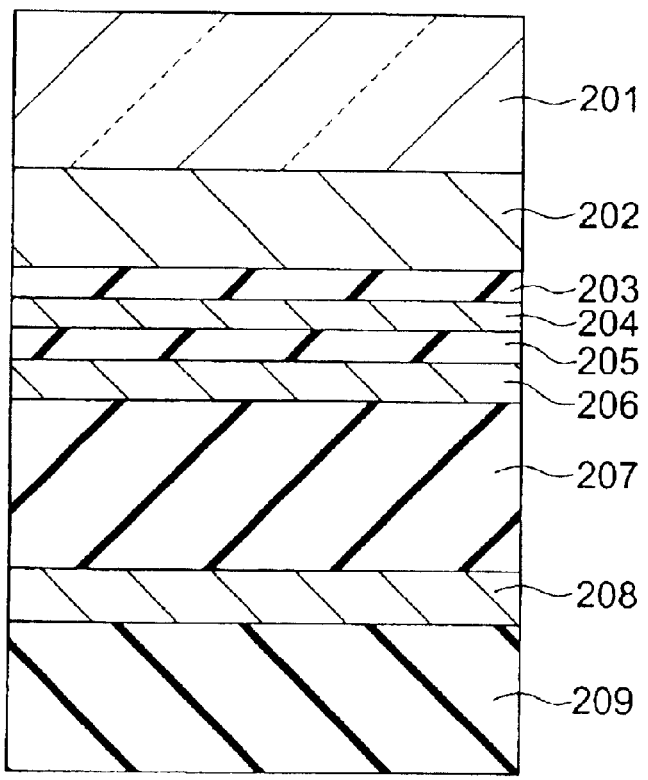
FIG. 9 is a sectional view showing the construction of the second embodiment of a phase change optical recording medium according to the present invention.

Referring to FIG. 9, the second embodiment of a phase change optical recording medium according to the present invention will be described below. The phase change optical recording medium in this embodiment has a construction wherein a metal reflecting film 202, a transparent dielectric film 203, a semitransparent metal film 204, a dielectric film 205, a recording film 206, a dielectric film 207, a semitransparent metal film 208 and a cover layer 209 are sequentially stacked on a substrate 201 of polycarbonate. That is, in the phase change optical recording medium in the first embodiment, another semitransparent metal film 208 is provided on the light incident side.

The features of this embodiment are as follows. In the conventional construction shown in FIG. 10, i.e. in the construction wherein three layers of dielectric/semitransparent film/dielectric film are provided between a recording film 304 and a metal reflecting film 302, it is not possible to enhance the ratio Ac/Aa while maintaining a large difference in reflectance between crystal and amorphous assuming that the absorptivity of the recording film in a crystal state is Ac and the absorptivity of the recording film in an amorphous state is Aa. However, as this embodiment, if three layers of dielectric film 203/semitransparent metal film 204/dielectric film 205 are provided between the recording film 206 and the reflecting film 202 and if another semitransparent metal film 208 is provided on the light incident side, it is possible to enhance Ac/Aa while maintaining the high reflectance change.

The internal energy of the recording film 206 in the crystal state is low, and the internal energy of the recording film in the amorphous state is high. That is, in order to melt the recording film in the crystal state, it is required to give a higher energy than that to melt the recording film 206 in the amorphous state. This means that the amorphous portion melts prior to the crystal portion in an adjacent region if both crystal and amorphous parts exist neighboring each other in a laser spot. Therefore, when a direct overwrite operation is carried out, a phenomenon takes place wherein although an amorphous mark melts to be a new mark, the crystal portion around the amorphous mark does not melt to form no mark. That is, the status before overwrite influences the state after overwrite. Therefore, new recording information is modulated by the previous information, and the overwrite erasing ratio is insufficient.

One means for solving this is to enhance Ac/Aa. Usually, in a so-called High-to-Low medium wherein the reflectance of the crystal portion Rc is higher than the reflectance of the amorphous portion Ra, Ac/Aa<1, because Ac+Rc=Aa+Ra=1 in the medium having the total reflection structure. For example, if Rc−Ra=0.2, there is a difference of 0.2 between Ac and Aa, so that it is required to provide a film for absorbing light in order to decrease the difference. However, for example, in order to achieve this on the conditions that Rc is 15% or more and Ra is 3% or less, the distance between the recording film 206 and the reflecting film 202 must be 25 nm or more. If a dielectric material having a low heat conductivity, such as $ZnS:SiO_2$, is used in order to decrease this distance, cooling after recording is too slow, and recrystallization and cross erase remarkably occur. In addition, if a dielectric film having a high heat conductivity is used so as to be adjacent to the recording film, cooling occurs immediately after heating the recording film 206, so that the sensitivity of the recording medium is remarkably bad. This can be improved to some extent if a dielectric film having the same heat conductivity as that of $ZnS:SiO_2$ is provided adjacent to the recording film 206 and if a dielectric film having a high heat conductivity is stacked thereon. However, since the heat conductivity is far worse than that in a case where a metal is used as this embodiment, it is not possible to radiate heat in lateral directions, and quenching is insufficient immediately after a recording power irradiation.

An example of this embodiment will be described below.

FIG. 9 shows a sectional construction of an example of an optical recording medium according to the present invention. The recording medium in this example has a construction wherein a reflecting film 202 of an Ag alloy, a dielectric film 203 of $ZnS:SiO_2$, a semitransparent film 204 of an Ag alloy, a dielectric film 205 of $ZnS:SiO_2$, a recording film 206 of GeSbTe, a dielectric film 207 of $ZnS:SiO_2$ and a semitransparent film 208 of an Ag alloy are stacked in order from the opposite side to light incidence. The thickness of these films is 100 nm, 10 nm, 15 nm, 10 nm, 12 nm, 120 nm and 12 nm, respectively, in the same order. A single layer film of an Ag alloy was separately prepared, and its complex refractive index (optical constant) was measured by ellipsometry. As a result, the complex refractive index was 0.50–1.73i at a wavelength of 405 nm. In addition, the complex refractive index (optical constant) of GeSbTe forming the recording film was similarly measured. As a result, the complex refractive index was 2.6–2.1i in an amorphous state, and 1.45–2.8i in a crystal state. In addition, the above described $ZnS:SiO_2$ is ZnS $SiO_2$=80:20 in mole ratio.

The phase-change optical recording media in this example was prepared by depositing films on a polycarbonate substrate 101 having a thickness of 1.1 mm in the above-described order by the sputtering method. After deposition, an ultraviolet curing resin was spin-coated to be photo-cured to form a cover layer 209 having a thickness of 0.1 mm. Then, the whole surface of the recording film was crystallized by a phase change medium initializing system having an elliptical beam having a width of 50 μm and a length of 1 μm, to complete the medium. Grooves having a depth of 40 nm are provided on the substrate at intervals of 0.6 μm. When it is evaluated as a land groove recording, a substrate having a track pitch of 0.3 μm was used. It is hereinafter assumed that the groove track means a track farther from the light incident surface, and the land track means a track nearer to the light incident surface.

After the reflectance of a non-grooved portion having no groove in the medium was measured, it was 17.5% in an initialized portion and it was 1.7% in an uninitialized portion.

Using the above described medium, record and erase experiments were carried out. Evaluation was carried out by means of an optical disk evaluating system having a pick-up which has an objective lens of numerical aperture NA=0.85 and a semiconductor laser having a wavelength of 405 nm. Assuming that a pattern having a shortest mark length of 0.15 μm was 3T and a pattern having a longest mark length of 0.55 μm was 11T, a recording experiment was carried out by irradiating with pulse patterns formed by combining a series of 3, 4, . . . , 11T at random.

The recording method was carried out by using the optimum recording power. When a random pattern was recorded only once, the jitter value was 8.2%. Then, the random pattern was overwritten on a groove track ten times. As a result, the obtained jitter was 8.2%. Then, the same random pattern was recorded on adjacent land tracks on both sides ten times, respectively, to be returned to the original track to examine the variation in jitter. As a result, the jitter was 8.2% which was not deteriorated.

This result was obtained by providing a very thin semitransparent Ag alloy film 208 on the light incident side and by carrying out absorptivity correction between crystal and amorphous portions of the recording film 206. That is, if absorptivity correction is not carried out, the ratio Ac/Aa of the absorptivity Ac of crystal to the absorptivity of amorphous is ~0.75. In the case of the optical recording medium in this example, the absorptivity is corrected to be 0.90, so that it is difficult to cause a different in temperature between a recording mark and other portions. Therefore, there is not caused a phenomenon wherein new recording is modulated by the remaining light during overwrite, i.e. by the previous recording. In addition, since the absolute value of light absorption of a recording mark (i.e. amorphous) in an adjacent track is suppressed, the mark deterioration in the adjacent track during cross erase is small.

As reflected therein, jitter values before and after cross erase are improved. In particular, the increase of jitter values due to cross erase does not occur.

In this example, operation at a wavelength of 405 nm has been described. After various possibilities was studied, it was revealed that there is preferably used a material wherein the real part n of refractive index satisfies 0<n<1 at a wavelength to be used. Therefore, in addition to Ag, Al or its alloy can be used at the above-described wavelength. Specifically, assuming that the complex refractive index of the semitransparent metal film 208 is $n_{208}-ik_{208}$, $n_{208}$ is preferably smaller if $k_{208}$ is the same, and $k_{208}$ is preferably larger if $n_{208}$ is the same. If another metal is added to pure Al or pure Ag, there is a tendency to increase $n_{208}$ as the added amount increases. Therefore, from the relationship between the composition of the alloy and the above-described refractive index, the composition ratio of Ag in the Ag alloy is preferably 90%, and the composition ratio of Al in the Al alloy is preferably 90%. The reason for this is that, if they are beyond these ranges, the difference in reflectance between amorphous and crystal portions decreases to decrease regenerative signals, and the absorptivity correcting effects are insufficient.

A medium was prepared by using an Ag alloy as the material of the semitransparent metal film 208 and changing the composition ratio of Ag in the Ag alloy. With this medium, the measured results of jitter values are shown in FIG. 17. As shown in FIG. 17, there were prepared a medium in example 1 wherein the composition ratio of Ag in the semitransparent metal film 208 is Ag=97.5 at %, a medium in example 2 wherein the composition ratio of Ag is Ag=92.0 at %, and a medium in comparative example wherein the composition ratio of Ag is Ag=88.0 at %. With respect to these media in examples 1, 2 and comparative example, jitter values after ten random signal recording operations in only a corresponding track are shown in 1Tr column of FIG. 17, and jitter values after ten overwrite operations of the same pattern in an adjacent track are shown in 3Tr column of FIG. 17. Furthermore, since the effects were only examined when the material of the semitransparent metal film 208 is changed, the same Ag alloy (Ag=97.5 at %, Pd=1.0 at %, Cu=1.5 at %) was used as the materials of reflecting film 202 and semitransparent metal film 204. FIG. 17 also shows the complex refractive index measured by light having a light source wavelength of 405 nm. As can be seen from FIG. 17, in examples 1 and 2 wherein the composition rate of Ag is high, jitter values are lower than those in comparative example before and after overwrite. Therefore, it is found that the composition ratio of Ag in the Ag alloy is preferably 90% or more.

When a metal other than the above described Ag alloy is used as the material of the semitransparent film 208, e.g. when an Al alloy is used, the same effects can be obtained if the composition ratio of Al in the Al alloy is 90% or more. However, for example, at a wavelength of 405 nm, if Au, Cu or another metal having a greater value of $n_{208}$ than that of Ag and Al is used, preferred effects can not be obtained. For example, when Au was used, if the reflectance of the crystal portion was 15%, the reflectance of the amorphous portion (uninitialized portion) was a large value of 6%, so that it was not possible to obtain a sufficient signal strength. After a jitter value was measured, the jitter value was 9.5% when only one random pattern was recorded. Moreover, the jitter value was 12% after the mark row of the random pattern was overwritten ten times, and the jitter value was 14.5% after overwriting in an adjacent track. Thus, the difference in reflectance is not only small, but the rise of the jitter value due to overwrite is large. Therefore, it was revealed that the absorptivity can not be sufficiently corrected, and the influence on the recording mark in the adjacent track can not be suppressed. The reason for this is that, since the optical constant of Au is 1.57–1.93i which is beyond the scope of this embodiment at the used wavelength, so that the ratio of absorptivity Ac/Aa can not be corrected.

However, when a light source having a longer wavelength range is used, e.g. a wavelength of about 650 nm, Au, Cu and their alloys can be used in addition to Ag, Al and their alloys. In that case, the composition ratio of Au or Cu is preferably higher, e.g. 90% or more. Also, if an Au or Cu alloy is used as the material of the semitransparent film 204, the composition ratio of Au or Cu is preferably higher, e.g. 90% or more.

While nothing has been provided between the recording film 206 and the dielectric films 205 and 207 sandwiching the recording film 206 therebetween in this example, a thin film may be provided before and after the recording film 206 in order to improve the erasing rate. The materials of this thin film include GeN, SiC, SiN and CrO. If the heat conductivity of this thin film is within the range defined in this embodiment, i.e. below 2.0 W/mK, it is within the scope of this embodiment, so that the above-described thin film may be substituted for a part of the dielectric film 105 of FIG. 1. Even if the heat conductivity of the above described thin film exceeds 2.0 W/mK, if the thickness of the thin film is 5 nm or less, it is possible to obtain the same effects as those in this embodiment, and the above described thin film can be substituted for a part of the dielectric film of FIG. 1.

The present invention should not be limited to the above described examples, but the invention can be modified without departing from the principle of the invention. For example, the recording film may be formed of any one of GeSbTeSn, GeSbTeBi, AgInSbTe, InSbTe, AgInGeSbTe, GeInSbTe and AgInSbTeV in addition to GeSbTe.

In the above described embodiment, the reflecting film 202, the dielectric film 203, the semitransparent metal film 204, the dielectric film 205, the recording film 206, the dielectric film 207 and the semitransparent metal film 208 have been sequentially stacked on the substrate 201 so as to allow light to be incident on the semitransparent metal film 208. Conversely, the semitransparent metal film 208, the dielectric film 207, the recording film 206, the dielectric film 205, the semitransparent metal film 204, the dielectric film 203 and the reflecting film 202 may be sequentially stacked on the substrate so as to allow light to be incident on the substrate. In this case, it is required to use an objective lens suited to allow light to be incident on the substrate, as a light source. In addition, a protective film for protecting the reflecting film 202 may be provided on a surface opposite to a surface on which the dielectric film 203 is formed.

U.S. Pat. No. 4,839,861 (Ikegawa, S. et al.) discloses a technique wherein an Au-Ge material is used as the material of a recording film for recording by a phase transition between crystal and crystal. Thus, the phase change optical recording should not be limited to a recording which is strictly carried out by only the phase transition between crystal and amorphous, but it may be a phase transition between a plurality of different crystalline states, or a phase transition between crystal and amorphous or between microcrystal and bulky crystal. In short, if the atomic arrangement can be reversibly changed to change the optical reflectance to hold recording, the present invention can be applied.

As described above, according to the present invention, even if the track pitch is decreased, it is possible to prevent cross erase, so that it is possible to enhance a recording capacity per one, thereby increasing the amount of information to be recorded.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. An optical recording medium comprising:

a reflecting film;

a first transparent film provided on the reflecting film;

a first semitransparent film provided on the first transparent film;

a second transparent film provided on the first semitransparent film;

a recording film provided on the second transparent film, the recording film being capable of reversibly changing an atomic arrangement; and a third transparent film provided on the recording film, wherein the first semitransparent film has a complex refractive index of n−ik satisfying relationships of 0<n<1 and 1<k, and a product of a thickness d (nm) of the first semitransparent film and an extinction coefficient k of the complex refractive index is d×k≦44.

2. An optical recording medium as set forth in claim 1, wherein a distance between the first semitransparent film and the recording film in a direction perpendicular to a film plane is 5 nm or longer but 15 nm or shorter.

3. An optical recording medium as set forth in claim 1, wherein the second transparent film has a heat conductivity of 2.0 W/mK or less.

4. An optical recording medium as set forth in claim 1, wherein the reflecting film has a complex refractive index of n'−ik' satisfying a relationship of 1<k', and a product of a thickness r of the reflecting film and an extinction coefficient k' of the complex refractive index is r×k'≧60.

5. An optical recording medium as set forth in claim 1, wherein the semitransparent film is formed of a simple substance or alloy containing 90 at % or more of at least one of aluminum, silver, gold and copper.

6. An optical recording medium as set forth in claim 1, which further comprises a second semitransparent film provided on the third transparent film, the second semitransparent film being formed of a simple substance or alloy containing 90 at % or more of at least one of aluminum, silver, gold and copper, the second semitransparent film having a thickness of 25 nm or less.

7. An optical recording medium comprising:

a reflecting film;

a first transparent film provided on the reflecting film;

a first semitransparent film provided on the first transparent film;

a second transparent film provided on the first semitransparent film;

a recording film provided on the second transparent film, the recording film being capable of reversibly changing an atomic arrangement; and a third transparent film provided on the recording film, wherein the first semitransparent film is formed of a simple substance or alloy containing 90 at % or more of at least one of aluminum, silver, gold and copper, the first semitransparent film having a thickness of 25 nm or less.

8. An optical recording medium as set forth in claim 7, wherein a distance between the first semitransparent film and the recording film in a direction perpendicular to a film plane is 5 nm or longer but 15 nm or shorter.

9. An optical recording medium as set forth in claim 7, wherein the second transparent film has a heat conductivity of 2.0 W/mK or less.

10. An optical recording medium as set forth in claim 7, wherein the reflecting film has a complex refractive index of n−ik satisfying a relationship of 1<k, and a product of a thickness r of the reflecting film and an extinction coefficient k of the complex refractive index is r×k≧60.

11. An optical recording medium as set forth in claim 7, which further comprises a second semitransparent film provided on the third transparent film, the second semitransparent film being formed of a simple substance or alloy containing 90 at % or more of at least one of aluminum, silver, gold and copper, the second semitransparent film having a thickness of 25 nm or less.

12. An optical recording medium comprising:

a reflecting film;

a first transparent film provided on the reflecting film;

a first semitransparent film provided on the first transparent film;

a second transparent film provided on the first semitransparent film;

a recording film provided on the second transparent film, the recording film being capable of reversibly changing an atomic arrangement;

a third transparent film provided on the recording film; and a second semitransparent film provided on the third transparent film, wherein the first semitransparent film is formed of a simple substance or alloy containing 90 at % or more of at least one of aluminum, silver, gold and copper, the first semitransparent film having a thickness of 25 nm or less, and wherein the second semitransparent film is formed of a simple substance or alloy containing 90 at % or more of at least one of aluminum, silver, gold and copper, the second semitransparent film having a thickness of 25 nm or less.

13. An optical recording medium as set forth in claim 12, wherein a distance between the first semitransparent film and the recording film in a direction perpendicular to a film plane is 5 nm or longer but 15 nm or shorter.

14. An optical recording medium as set forth in claim 12, wherein the second transparent film has a heat conductivity of 2.0 W/mK or less.

15. An optical recording medium as set forth in claim 12, wherein the reflecting film has a complex refractive index of n−ik satisfying a relationship of 1<k, and a product of a thickness r of the reflecting film and an extinction coefficient k of the complex refractive index is r×k≧60.

16. An optical recording medium as set forth in claim 12, wherein the first semitransparent film has a complex refractive index of n−ik satisfying relationships of 0<n<1 and 1<k.

* * * * *